United States Patent [19]

Rahlfs

[11] 3,957,566

[45] May 18, 1976

[54] APPARATUS FOR MAKING LAMINATED THERMOPLASTIC FILM

[75] Inventor: Herbert Rahlfs, Troisdorf-Sieglar, Germany

[73] Assignee: Reifenhauser KG, Troisdorf, Germany

[22] Filed: Dec. 3, 1973

[21] Appl. No.: 421,493

[30] Foreign Application Priority Data

Dec. 2, 1972  Germany............................ 2259089

[52] U.S. Cl................................. 156/500; 156/244; 264/95; 264/172; 264/173; 264/176 R; 425/114; 425/133.1

[51] Int. Cl.² ........................................... B29F 3/08

[58] Field of Search .............. 156/244, 500; 264/88, 264/94, 95, 99, 172, 173, 176 R; 425/114, 133.1, 326, 387

[56] References Cited
UNITED STATES PATENTS

| | | |
|---|---|---|
| 2,753,596 | 7/1956 | Bailey................................ 156/244 |
| 3,541,191 | 11/1970 | Thordarson........................... 264/95 |
| 3,758,354 | 9/1973 | Sakurai et al....................... 156/244 |

FOREIGN PATENTS OR APPLICATIONS 1,960,962   8/1971   Germany.............................. 264/95

*Primary Examiner*—Caleb Weston
*Attorney, Agent, or Firm*—Karl F. Ross; Herbert Dubno

[57] ABSTRACT

Several thermoplastic tubes to be bonded to one another are jointly extruded through concentric annular orifices while cool air is blown from annular Venturi nozzles in concentric streams past the outer surface of the outermost tube and past the inner surface of the innermost tube to accelerate their solidification. The inter-tube space or spaces can be inflated by similar air streams blown at least in part along their confronting tube surfaces. The return of the injected air from the innermost and inter-tube spaces takes place through conduits disposed midway between the nozzles.

7 Claims, 3 Drawing Figures

APPARATUS FOR MAKING LAMINATED THERMOPLASTIC FILM

FIELD OF THE INVENTION

My present invention relates to the manufacture of laminated thermoplastic film in the form of tubing which, if desired, may be subsequently cut transversely into sections or slitted longitudinally to form bags or sheets as is well known per se.

BACKGROUND OF THE INVENTION

In commonly owned U.S. Pat. No. 3,726,743 there has been disclosed an apparatus for making such laminated film from two concentrically extruded thermoplastic tubes, with admission of air under pressure into the space between the tubes and into the inner tube to inflate same. The air pressures are so adjusted that the inter-tube space terminates a short distance from the extrusion head to let the two tubes come into adhesive contact with each other so as to form a laminate; further downstream, the laminate passes between a pair of pinch rolls which flatten the bonded and nested tubes so as to allow them to be wound up on a reel. A stream of air is radially trained upon the outer tube to accelerate its solidification. In this process, the plastic material undergoes a desirable molecular orientation, generally biaxial as more fully described in that patent.

OBJECTS OF THE INVENTION

An object of my present invention is to provide a further improvement in the described system which enhances the molecular orientation of the plastic material, especially in the transverse direction, and which accelerates the hardening of the tubes so as to permit a foreshortening of the distance between the extrusion head and the pinch rolls or other pressure means serving to flatten the laminate.

A related object is to provide an apparatus of compact design to carry out this process.

SUMMARY OF THE INVENTION

In accordance with my present invention, which is applicable to the manufacture of laminates from two or more nested thermoplastic tubes, concentric streams of cooling air are passed in the general direction of extrusion at least along the outer surface of the innermost tube as they emerge from their respective extrusion orifices. This ensures a more effective cooling of the nonbonding tube surfaces ahead of the zone in which the other, confronting tube surfaces are brought into contact with one another. The more intense cooling effect is due to the aerodynamic stability of the flow which passes roughly parallel to the tube axis and therefore maintains prolonged contact with the advancing thermoplastic film.

In order to generate these air streams, an apparatus embodying my invention has a head with a plurality of annular blow nozzles concentrically disposed around and within the annular orifices through which the nested tubes are extruded. These nozzles are advantageously designed to create a Venturi effect by forming constrictions around the outermost tube and within the innermost tube, with entrainment of adjacent air masses by the emitted annular streams. Such entrainment creates a high degree of turbulence with resulting detachment of the boundary layers from the tube surfaces and improved heat exchange between the plastic film and the cooling air.

The cooling air blown into the innermost tube may be supplemented, if necessary, by additional air introduced centrally into that tube to help inflate same, with provision of an outlet for the injected air at or near the center of the nozzle array.

In similar manner, cooling air may be directed by a pair of annular blow nozzles into the space between two tubes along their confronting surfaces, again with exhaustion of this air through one or more outlets located about midway between these two nozzles. If the laminate is composed of more than two thermoplastic tubes, such an additional pair of blow nozzles may be disposed at the entrance of each inter-tube space, i.e. between every two adjoining extrusion orifices.

BRIEF DESCRIPTION OF THE DRAWING

The above and other features of my invention will be described in detail hereinafter with reference to the accompanying drawing in which.

SPECIFIC DESCRIPTION

Figure 1:
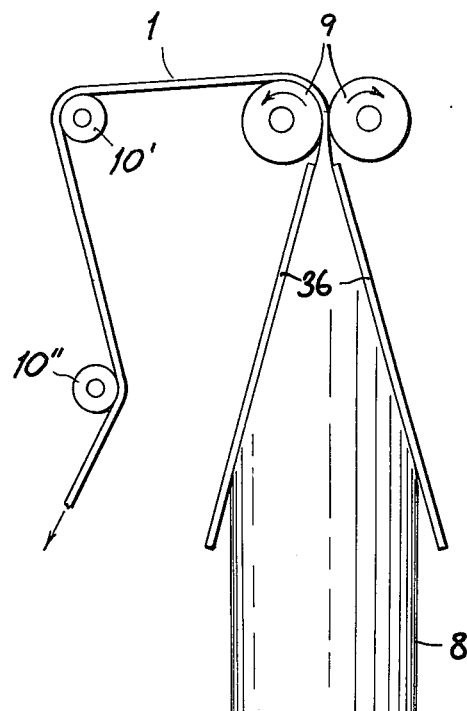
FIG. 1 is a somewhat diagrammatical elevational view (partly in section) of an apparatus for making laminated thermoplastic film in accordance with my invention.
Figure 1:
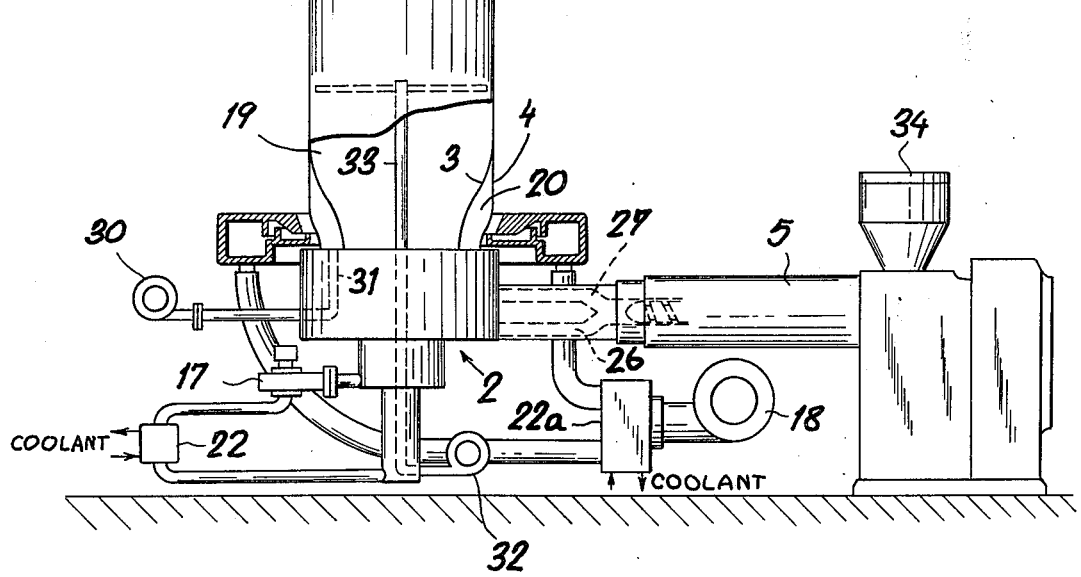

The apparatus shown in FIG. 1 is generally similar to that disclosed in the aforementioned U.S. Pat. No. 3,726,743 and comprises a conventional screw-type extruder 5 working into a nozzle head 2 which is provided with a pair of concentric annular orifices 6, 7 (see FIG. 2) supplied with flowable thermoplastic material (e.g. polyethylene) via respective channels 26, 27 controllable by valves 28, 29. The necessary extrusion temperature is maintained by the circulation of a hot fluid through passages 35 in head 2.

The thermoplastic mass issuing from orifices 6 and 7 forms two coaxial tubes 3 and 4 which are initially inflated to form an inner space 19 and an annular inter-tube space 20. At a location 8 downstream of nozzle head 2 the tubes 3 and 4 merge into a tubular laminate 1. Converging guide members 36 direct this laminate into the nip of a pair of pinch rolls 9 to flatten it; via deflecting rollers 10', 10'' the flattened laminate is fed to a nonillustrated wind-up reel.

In accordance with my present invention, nozzle head 2 carries a ring 11 which forms an annular nozzle 14 for the blowing of a stream of cooling air 25 along the outer surface of tube 4 in generally axial direction, i.e. upwardly as shown in the drawing. Ring 11 has an upwardly diverging peripheral surface 11a, of a diameter larger than that of extrusion orifice 7, which creates a Venturi effect with entrainment of ambient air in the flow direction. A disk 12, of a diameter smaller than that of orifice 6, is centered on the axis of head 2 and forms an annular nozzle 13 for blowing an air stream 24 into space 19 along the inner surface of tube 3. Disk 12 has an upwardly converging peripheral surface 12a also exerting a Venturi effect upon the relatively large volume of air present in space 19. This air volume, limited by the pinch rolls 9, is under sufficient pressure to expand the inner tube 3 into contact with the outer tube 4 in lamination zone 8. A central conduit 33, connected to a blower 32, supplements the air flow 24 to create the necessary internal pressure, this conduit having radial extensions which terminate at a multiplicity of angularly spaced locations near the inner surface of inflated tube 3.

Air streams 24 and 25 are generated by a pair of blowers 17, 18 and pass through respective coolers 22 and 22a. The air from space 19 is recirculated in a substantially closed path through a central outlet, formed by an aperture 37 in disk 12 and by a tubular extension 37' axially traversing the lead 2, to cooler 22 and blower 17 via a control valve 23 which also lets excess air escape into the atmosphere; another valve 23a controls the outflow from blower 32, the two valves being thus operable to regulate the air pressure in space 19.

Figure 2:
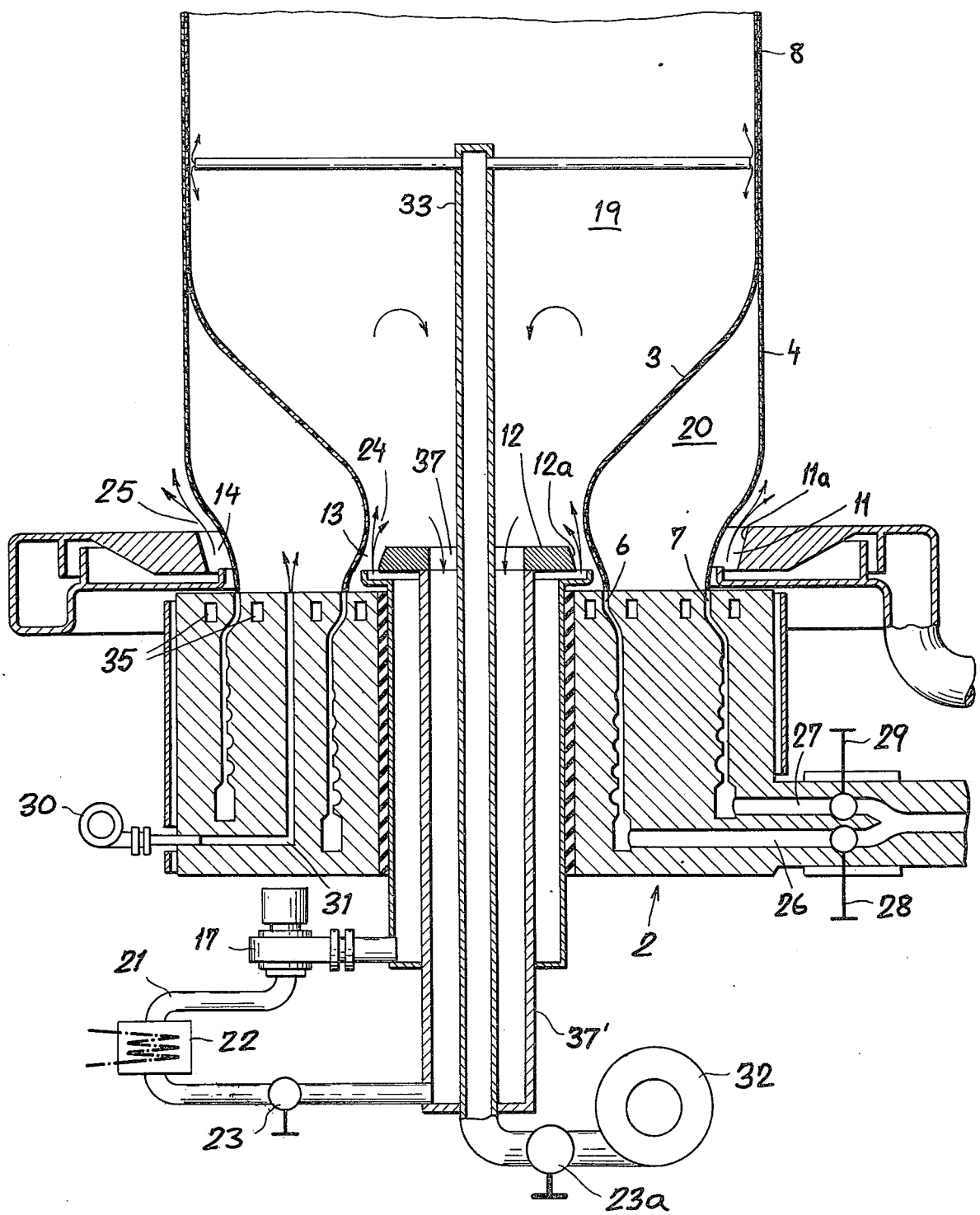
FIG. 2 is an enlarged fragmentary sectional elevation of the apparatus of FIG. 1.

In the system of FIGS. 1 and 2 the inter-tube space 20 is inflated, to the necessary extent, by air pressure from a blower 30 working into a channel 31 which opens into the space 20 midway between orifices 6 and 7. Another such channel, not shown, may be used to exhaust excess air from space 20, with provision of one or more control valves to regulate the air pressure in that space; it is also possible to provide the channel 31 with a bypass containing an adjustable throttle valve to establish the desired air pressure. In some instances the blower 30 and its air-discharge channel 31 may be omitted, the shape of the tubes 3 and 4 in the regin of space 20 being then maintained by the suction created along their surfaces by the aforedescribed Venturi effect; in extreme cases, the operation of blower 30 may be reversed to create suction instead of pressure.

Figure 3:
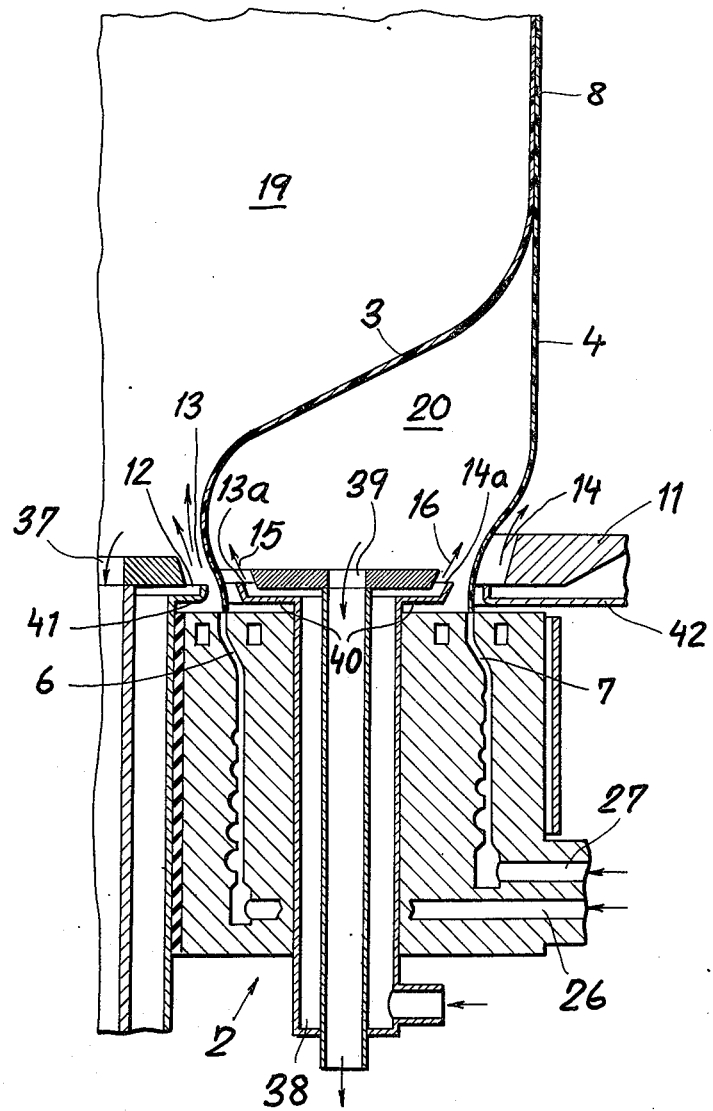
FIG. 3 is a view similar to FIG. 2, illustrating a modification.

The system of FIG. 3 differs from that of FIGS. 1 and 2 by the provision of additional annular blow nozzles 13a and 14a opening into the space 20 and supplying respective air streams 15a and 16a along the confronting surfaces of tube 3 and 4. The air thus introduced into space 20, from a nonillustrated blower via a conduit 38, is evacuated through another conduit 39 forming an air outlet midway between nozzles 13a and 14a. The two conduits 38 and 39 may again form part of a closed circuit including a nonillustrated cooler. Conduit 38 opens from below into an annular tray 40 serving as an air distributor for the circular gaps constituting the nozzles 13a and 14a; similar air-distributing trays 41 and 42 are provided for nozzles 13 and 14, respectively. A certain Venturi effect will also be present at the gaps 13a and 14a to cause entrainment of the body of air in space 20 which is thereby set in turbulent motion. Naturally, the cooling effect of the air introduced into space 20 should not be so severe as to prevent the bonding of the tubes 3 and 4 to each other in zone 8.

It will be evident that extrusion orifices 6 and 7 could be supplied from a single channel in lieu of the two channels 26 and 27 shown in the drawing.

The system according to my invention allows the pinch rolls 9 to be disposed relatively close to the extrusion head 2 even in the case of high-rate production.

I claim:

1. An apparatus for making laminated thermoplastic film, comprising:

an extrusion head provided with a plurality of concentric annular orifices centered on a common axis for extruding several thermoplastic tubes in nested relationship;

blowing means forming an axially diverging first annular nozzle adjacent a face of said head concentrically surrounding the outermost orifice and an axially converging second annular nozzle adjacent said face concentrically surrounded by the innermost orifice for training respective streams of cooling air in the general direction of extrusion along the outer surface of the outermost tube and along the inner surface of the innermost tube emerging from said orifices with creation of sufficient air pressure in said innermost tube to bring the tubes into adhesive contact with one another whereby a laminate is formed; and pressure means downstream of said head for flattening said laminate.

2. An apparatus as defined in claim 1, further comprising a source of supplemental air opening substantially centrally into the interior or said innermost tube for helping inflate same.

3. An apparatus as defined in claim 1 wherein said blowing means forms at least one pair of further annular nozzles intermediate two of said orifices for training additional streams of cooling air along confronting surfaces of the tubes emerging from the last-mentioned orifices.

4. An apparatus as defined in claim 3, further comprising exhaust means for the additional cooling air disposed substantially midway between said pair of nozzles.

5. An apparatus as defined in claim 1 wherein said first nozzle comprises a ring with an inner peripheral surface diverging in the direction of air flow and forming a constriction around the outermost tube, said second nozzle comprising a disk with an outer peripheral surface converging in the direction of air flow and forming a constriction within the innermost tube.

6. An apparatus as defined in claim 5 wherein said disk is provided with a central aperture forming an outlet for the return of air introduced into the innermost tube and with a tubular extension passing axially through said head, said outlet being connected to said second nozzle via said extension in a substantially closed path.

7. An apparatus as defined in claim 6, further comprising a conduit extending axially through said tubular extension into the innermost tube, and a source of supplemental air connected to said conduit.

* * * * *